(12) United States Patent
Florek

(10) Patent No.: US 9,629,485 B2
(45) Date of Patent: Apr. 25, 2017

(54) AWARD DISPLAY APPARATUS

(71) Applicant: Brian Anthony Florek, Matawan, NJ (US)

(72) Inventor: Brian Anthony Florek, Matawan, NJ (US)

( * ) Notice: Subject to any disclaimer, the term of this patent is extended or adjusted under 35 U.S.C. 154(b) by 0 days.

(21) Appl. No.: 14/564,615

(22) Filed: Dec. 9, 2014

(65) Prior Publication Data

US 2015/0090676 A1    Apr. 2, 2015

Related U.S. Application Data

(63) Continuation-in-part of application No. 13/307,948, filed on Nov. 30, 2011, now abandoned.

(51) Int. Cl.

| | |
|---|---|
| *A47F 5/08* | (2006.01) |
| *A47F 7/00* | (2006.01) |
| *A47G 1/12* | (2006.01) |
| *F16M 13/02* | (2006.01) |
| *A47G 33/00* | (2006.01) |
| *A47G 1/16* | (2006.01) |

(52) U.S. Cl.
 CPC ............. *A47G 1/12* (2013.01); *A47F 5/0876* (2013.01); *A47G 1/16* (2013.01); *A47G 33/004* (2013.01); *F16M 13/02* (2013.01)

(58) Field of Classification Search
 CPC .......... A47G 1/12; A47G 1/16; A47G 33/004; A47G 29/10; A47G 1/1646; A47G 25/74; A47G 25/746; A44C 3/00; A47B 96/027; A47B 47/022; A47B 57/045; A47F 7/0085; A47F 5/0846; A47F 7/12; A47F 5/08; A47F 5/0823

USPC ........ 211/125, 106.01, 61, 41.7, 13.1, 87.01, 211/85.7, 85.3, 85.9, 90.01, 94.01, 40, 211/88.01, 70.6, 60.1, 59.1, 65, 74, 71; D6/552, 553, 567, 574

See application file for complete search history.

(56) References Cited

U.S. PATENT DOCUMENTS

| 843,826 | A | * | 2/1907 | Kloeppinger | A47F 7/283 211/75 |
|---|---|---|---|---|---|
| D58,293 | S | * | 7/1921 | Lickert | 211/88.01 |
| 1,697,711 | A | * | 1/1929 | Brown | A47J 47/16 211/88.01 |
| 2,096,024 | A | * | 10/1937 | Anderson | A47B 96/022 108/30 |
| 2,118,465 | A | * | 5/1938 | Grose | A47K 1/09 211/65 |
| 2,872,744 | A | * | 2/1959 | Dallen | B43L 1/06 434/417 |
| 3,212,836 | A | * | 10/1965 | Johnson | A47B 57/34 211/187 |
| 3,225,940 | A | * | 12/1965 | Story | A47B 61/00 108/30 |
| 3,351,403 | A | * | 11/1967 | Magnuson | A47B 61/00 211/186 |

(Continued)

*Primary Examiner* — Jennifer E Novosad

(57) ABSTRACT

The invention is an award display apparatus comprised of groove-like recessions, a staggered peg system, and a trophy shelf for the secure and upright fitting and display of pin-style medal cases, trophies, plaques, and lanyard-style medal awards. The present invention is wall-mountable and can be made in various sizes and fashions to house and display a plethora of accolades in a variety of fashions and quantities.

10 Claims, 9 Drawing Sheets

(56) References Cited

U.S. PATENT DOCUMENTS

| | | | | |
|---|---|---|---|---|
| 3,650,407 A * | 3/1972 | Benham, Jr. | A47B 81/00 | 211/14 |
| 3,870,157 A * | 3/1975 | Hayward | A47B 96/027 | 108/29 |
| 3,986,649 A * | 10/1976 | Heimstra | B60R 7/043 | 211/42 |
| 4,154,159 A * | 5/1979 | Ortega | B65B 27/083 | 100/34 |
| 4,485,929 A * | 12/1984 | Betts, Sr. | B01L 9/00 | 211/59.1 |
| D306,385 S * | 3/1990 | Alexander | D6/552 | |
| 4,909,397 A * | 3/1990 | Huber | B42F 15/0035 | 211/46 |
| D314,115 S * | 1/1991 | Murphy | D6/572 | |
| 5,038,944 A * | 8/1991 | Sorensen | G09F 1/10 | 211/59.1 |
| D320,325 S * | 10/1991 | Barfield | D6/552 | |
| 5,085,327 A * | 2/1992 | Mercer, Jr. | A63B 71/0045 | 211/14 |
| 5,097,966 A * | 3/1992 | Miller | B25H 3/04 | 211/65 |
| 5,101,988 A * | 4/1992 | Meyer | A47F 5/08 | 211/184 |
| D353,295 S * | 12/1994 | Bodine | D19/113 | |
| 5,413,228 A * | 5/1995 | Le Clerc | A47G 1/0616 | 211/13.1 |
| D426,999 S * | 6/2000 | Smith | D6/574 | |
| D458,070 S * | 6/2002 | Bennett | D6/567 | |
| 6,520,350 B1 * | 2/2003 | Smith | B25H 3/04 | 211/74 |
| 6,581,788 B1 * | 6/2003 | Winig | A47B 96/027 | 211/183 |
| 7,896,176 B2 * | 3/2011 | McCormick | A47B 81/00 | 211/14 |
| 8,084,675 B1 * | 12/2011 | Covert | G10G 5/00 | 211/85.6 |
| 8,376,299 B2 * | 2/2013 | Burkman | A47G 1/16 | 108/42 |
| D747,895 S * | 1/2016 | Florek | A47F 5/08 | D6/552 |
| D775,477 S * | 1/2017 | Corless | D6/320 | |
| 2004/0195194 A1 * | 10/2004 | Belokin | A47F 5/0815 | 211/87.01 |
| 2007/0131631 A1 * | 6/2007 | Dewey | A47F 5/0815 | 211/59.1 |
| 2007/0193967 A1 * | 8/2007 | Ryan | A47B 81/005 | 211/70.5 |
| 2008/0017599 A1 * | 1/2008 | Springer | A47F 7/12 | 211/85.3 |
| 2008/0083679 A1 * | 4/2008 | Watts | A47B 87/0276 | 211/41.12 |
| 2009/0283486 A1 * | 11/2009 | Reason-Kerkhoff | A63B 71/0036 | 211/85.7 |
| 2010/0072151 A1 * | 3/2010 | Botkin | A47B 96/067 | 211/134 |
| 2010/0155565 A1 * | 6/2010 | Bernstein | A47G 1/17 | 248/467 |
| 2015/0090676 A1 * | 4/2015 | Florek | A47G 1/12 | 211/13.1 |

\* cited by examiner

AWARD DISPLAY APPARATUS

FIELD OF INVENTION

This present invention relates generally to display racks and shelving. More particularly, this present invention relates to wall-mountable display racks and shelves that are specifically designed to display, hold and showcase trophies, lanyard medal awards, cased pin-style medal awards, and award plaques.

BACKGROUND OF INVENTION

There is a clear demand in the market for a simple, all-in-one, award display rack that allows a user to display, hold, and showcase a variety of accolades, including pin-style medals while they are within their 2⅝"×3⅝"×⅝" cases.

It has been a long-standing tradition to reward artists, athletes, and other performers with award medals as a means of recognizing and acknowledging their achievements of excellence in a particular field, art, or sport. These medals come in two variations; as either ribbon-style lanyard medals or pin-style medals. Pin-style medals are presented inside plastic cases that have dimensions of 2⅝" length×3⅝" height×⅝" depth (width).

It is not uncommon for a devoted athlete, artist, or performer to accumulate a large number of both kinds of these award medals during their career of participation in a given activity. It stands to reason that the recipient of said award medals would take great pride in displaying these hard-earned accolades. However, the available alternatives in this field are inadequate and often unnecessarily complicated and/or require undesirable means to accomplish this simple objective.

The vast majority of prior art is not designed to hold more than a few awards, and no prior art is designed to accommodate both styles of award medals (pin-style and lanyard style) commonly presented while simultaneously allowing for the pin-style medals to remain in their protective casing to guard against the undesirable effects of handling, use, and/or natural exposure. Furthermore, prior art in this field requires unnecessarily complicated procedures in order to attach, affix, or display the medal(s), eliminating an effortless reorganization or replacement of these award medals.

Award medals are given out as accolades in a plethora of societal activities; to name just a few, award medals are often presented for achievements throughout all levels of school sporting and academic competition, as well as independent performing arts, such as martial arts, swimming, gymnastics, dancing, and a countess list of others. It is not uncommon for someone such as a college athlete to accumulate an excess of fifty award medals over the course of their involvement in a particular sport. While some prior art supports the display of several medals, none are designed to offer a simple, practical, and compact means to display a large quantity of them while simultaneously accommodating multiple styles of accolades.

The shortcomings of prior art currently on the market are clear, none provide a practical means for an accomplished recipient of various styles of accolades, including lanyard-style and pin-style award medals, trophies and plaques to display their complete collection of awards all on one display unit. Prior art in this field is designed to either display a single type of medal, such as lanyard ribbon-style award medals or pin-style medals, however, not both simultaneously. As both types of these medals, as well as trophies and plaques, are all frequently awarded common accolades for athletes and performers, a product, such as the current invention, is desirable so that all a recipient's accolades can proudly be displayed together.

Another shortcoming addressed by the current invention is that prior art in this field for displaying pin-style medals requires meticulous construction and attachment of the pin-style medals to the display unit by physically pinning the medal to the display unit in one way or another. Such functionality makes it difficult to effortlessly display, organize, attach and or replace the medals on a display. Furthermore, pinning said pin-style medals to a display unit requires that the medals be manually handled and removed from their above referenced protective plastic casing(s). For multiple reasons, the handling of such medals and the removal of them from their protective plastic cases is highly undesirable and an unfortunate necessity of prior art in this field. Handling of heirloom and precious award medals can cause corrosion, breakage, and other unwanted consequences, thus necessitating the need for a product that allows pin-style award medals to be easily displayed, held, organized and stored while still in their original plastic casings.

The present invention, through the utilization of a staggered peg system and accompanying unique groove-style award medal case holder, offers a new, practical, and highly-desirable means for a successful performer to proudly display the full extent of their awards all on one unit, while also preserving their pin-style medal awards by allowing for their display while still in their 2⅝"×3⅝"×⅝" plastic casings.

Prior art does not achieve the aforementioned benefits of the current invention, and thus requires the user to narrow the selection of awards they chose to display, or alternatively, display them in an unfavorable way which could cause detriment to the medals. The present invention remedies these issues while achieving an easy to operate and cost efficient product.

SUMMARY OF INVENTION

The object of the present invention is to achieve a truly all-in-one medal award rack that can be used for the display of multiple awards, including, but not being limited to, medals of both the lanyard ribbon-style (also herein referred to as "ribbon-style lanyard medals", "ribbon medals", "lanyard-style medals" and "lanyard medals") and pin-style (also herein referred to as "cased medals", "pin medals", and "pin-style medals"), as well as honorary plaques, and trophies.

In order to accomplish this objective the preset invention may utilize a peg system for the suspension of ribbon-style lanyard medals, as well as at least one groove-like, cavity-like, and/or vice-like compressible recession slot for the upright holding and/or removable securing of at least one 2⅝"×3⅝"×⅝" pin-style award medal casing and/or plaque for easy display, organization, and storage.

It is an additional objective of the present invention that all lanyard-style medals displayed may be made fully visible from a frontal perspective by use of a staggered peg system more fully described herein.

The present invention is an award display apparatus that may comprise of at least two planar members, wherein at least one of the planar members may further comprise of at least one groove-like recession that can measure, or is mechanically or manually compressible to, exactly five-eighths of an inch in width, to allow for the creation of a hollow for an at least partial insertion therebetween of award plaques and/or pin-style medal plastic display cases, which cases measure two and five-eighths of an inch in length, by three and five-eighths of an inch in height, by five-eighths of an inch in width (depth), for removable yet secure, tight, and safe fitting, whereby the said width of the groove-like recession(s) can create ample pressure on at least two surfaces of said pin-style medal cases for their secure and upright display.

It is a further object of the present invention that at least one planar member(s) can also comprise of at least two horizontal rows of pegs, for the storing, hanging and displaying of, lanyard-ribbon style medals and wherein said horizontal rows of pegs can be positioned in a staggered fashion for optimal viewing capabilities of lanyard-style medals from a head-on perspective so that medals will not hang one in front of another.

The present invention may further have the planar member with the horizontally protruding pegs attached to or inserted into, and extending outwardly from, a surface of a second, or additional, planar member in at least one of a multitude of the following ways, wherein the pegs may be inserted into holes which are drilled at least partially throughout and into the second, or additional, planar member and where the pegs may be inserted into said holes and held into place using at least one of an adhesive, screws or nails.

It is a further objective of the present that the planar members of the present invention may be able to be positioned so as to create a trophy shelf. Accordingly, at least one surface of said second, or additional, planar member can be connected to, attached or assembled at a right angle to the first planar member on a surface of the first planar member that does not have the aforementioned pegs protruding therefrom it, by at least one of the following means: screws, nails, metal bonding, an adhesive, and said second planar member may be also attached, connected to, or assembled in a position above or below the first planar member so as to create a shelf for the holding, storing, and display of trophies and other accolades.

The at least one groove-like recession of the present invention may achieve the same desired and necessary fixed or adjustable width of five-eighths of an inch by utilizing one sidewall built onto or into the present invention while also utilizing the wall to which the product is mounted as a second sidewall of the groove-like recession. Alternatively or additionally, the present invention may have the two sidewalls of each groove-like recession directly built into or onto the present invention and not utilize the wall to which the invention is mounted as a sidewall for the groove-like recession(s).

Although preferred embodiments of the present invention have been described it will be understood by those skilled in the art that the present invention should not be limited to the described preferred embodiments. Rather, various changes and modifications can be made within the spirit and scope of the present invention.

DETAILED DESCRIPTION

Figure 1:
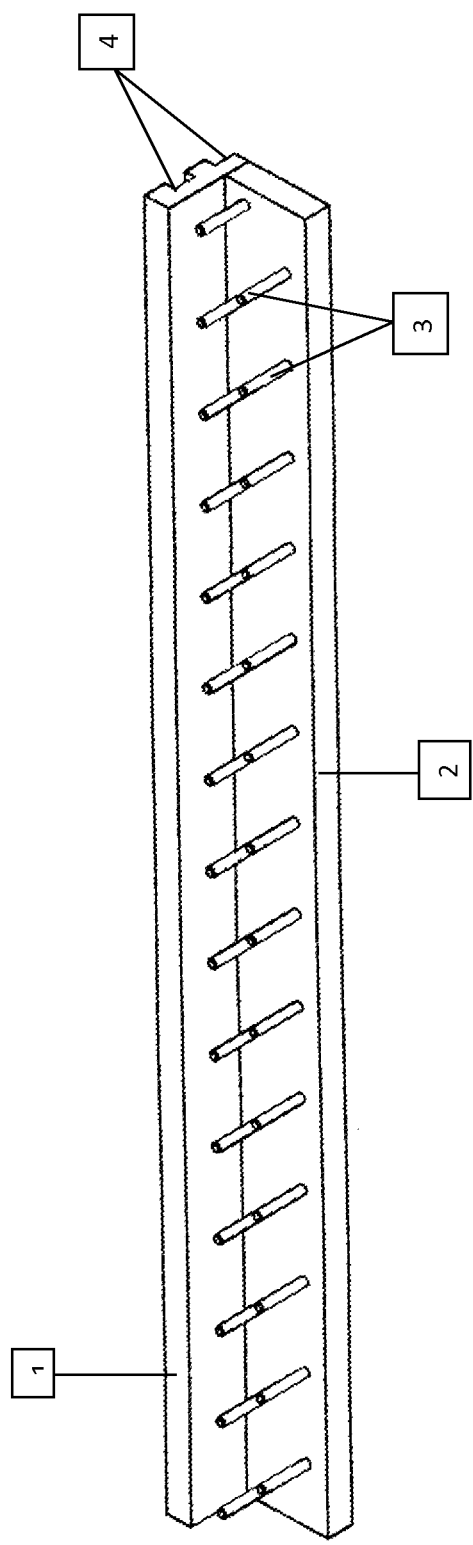
FIG. 1 an isometric view of a preferred embodiment of the present invention in its entirety. This isometric view illustrates the structural features of the present invention, including a top shelf board (also herein referred to as a second planar member), 1, a backboard (also herein referred to as a first planar member), 2, a staggered peg system, 3, and fitted groove-like recessions, 4.

The present invention is the first of its kind in the field that is uniquely tailored to specifically accommodate pin-style medals while they are still inside their 2⅝"×3⅝"×⅝" plastic cases, as well as multiple lanyard-style ribbon medals, trophies and plaques. The features of the present invention provide numerous advantages over prior art in this field and thus expand this current field of art. FIG. 1 provides an isometric view of a preferred embodiment of the present invention in its entirety. From this figure the primary structural features of the present invention are illustrated. These features comprise of a top shelf board, 1, a backboard, 2, a staggered peg system, 3, and fitted groove-like recessions, 4.

The top shelf board, 1, can be attached or assembled directly or indirectly to the backboard, 2, using any of the following means, or any combination of the following: screws, nails, metal bonding, an adhesive (such as glue), or in the alternative, the top shelf board, 1, and the backboard, 2, can be one solid piece, molded as a unitary piece. In the illustrated preferred embodiment of the invention within FIG. 4, an aerial view of the top shelf board, 1, provides guidance to a possible placement of screws and/or nails for attaching the top shelf board, 1, to the backboard, 2. In this embodiment the screws and/or nails are inserted into the top shelf board, 1, in a vertical position pointing downward into the backboard, 2. These can be inserted at varying distances, quantities, and placements from those illustrated in the one embodiment depicted in FIG. 4.

Figure 4:
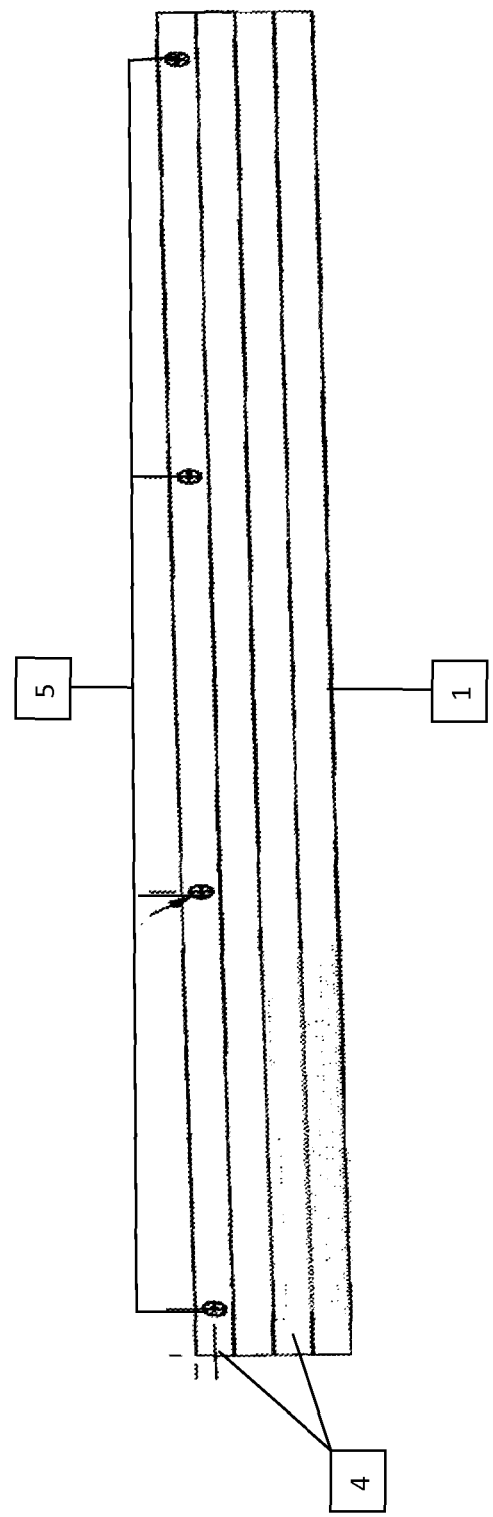
FIG. 4 is an overhead perspective of a preferred embodiment of the present invention. This figure depicts an aerial view of the top shelf board, 1, as well as a preferred placement of groove-like recessions, 4, which alternatively or additionally can be vice-like slots, for the removable placement and securing of pin-style medal cases in an upright and forward facing fashion. In one embodiment of the present invention, a top shelf board, 1, may be connected to a backboard, 2, by the use of screws and/or nails, 5, inserted at varying distances as illustrated in this one embodiment in FIG. 4.
Figure 6:
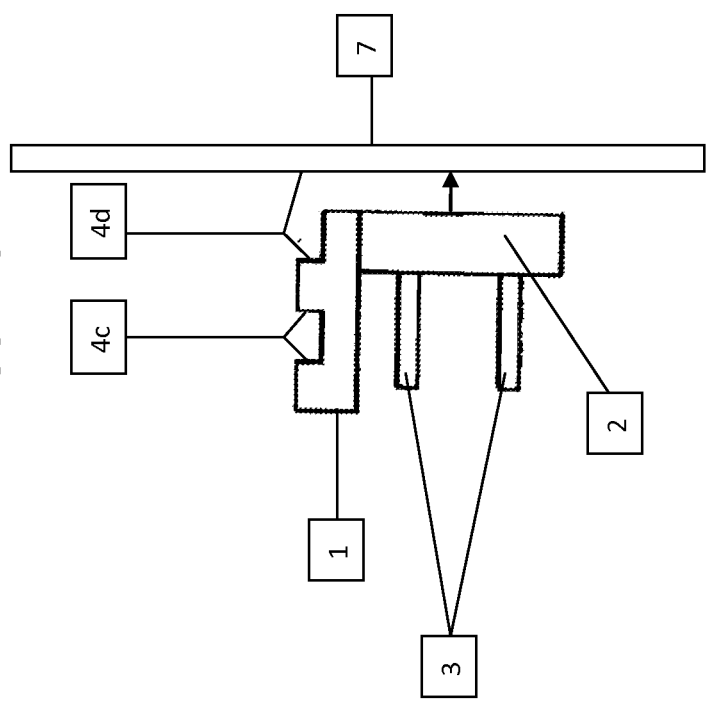
FIG. 6 is a side perspective view of a preferred embodiment of the present invention, similar to that of FIG. 5. However, in FIG. 6, the sidewalls of the groove-like recessions depicted in FIG. 5 have been indicated by 4c and 4d, respectively. In this illustration, the closed grooved-like recession (depicted as 4a in FIG. 5) comprises two sidewalls, 4c, making this embodiment of the groove-like recession complete in and of itself on the product. The partially open groove-like recession (depicted as 4b in FIG. 5) however is shown comprising of one sidewall, 4d, on the present invention and the opposing sidewall to this groove-like recession is created by a wall, 7, to which the present invention is to be mounted for proper use.

FIG. 4 also depicts one preferred placement and construction of groove-like recesses (also referred to herein as recessions), 4, which alternatively can be integrated into the present invention as vice-like slots or material inserts and/or linings, that may or may not comprise of moveable parts within the invention that compress and/or line the sidewalls of said groove-like recessions, 4c of FIG. 6, to achieve the same desired application of pressure onto at least a portion of the front and rear surfaces of the cases of pin-style medals (see 8, FIG. 9), to achieve the same desired objective of firmly holding these cases in place for display. The said groove-like recessions, 4, of the present invention must be cut to, or alternatively be able of compressing to, a width of ⅝" in order to firmly and securely hold said pin-style medal cases, 8. The depth of said groove-like recessions may vary, but the depth should be at least of one-sixteenth of an inch deep. The groove-like recessions, 4, can be made by routing, molding or sculpting out the top shelf, 1, or alternatively the groove-like recessions, 4, can be made by building up the sidewalls, 4c, of the top shelf board, 1.

Figure 7:
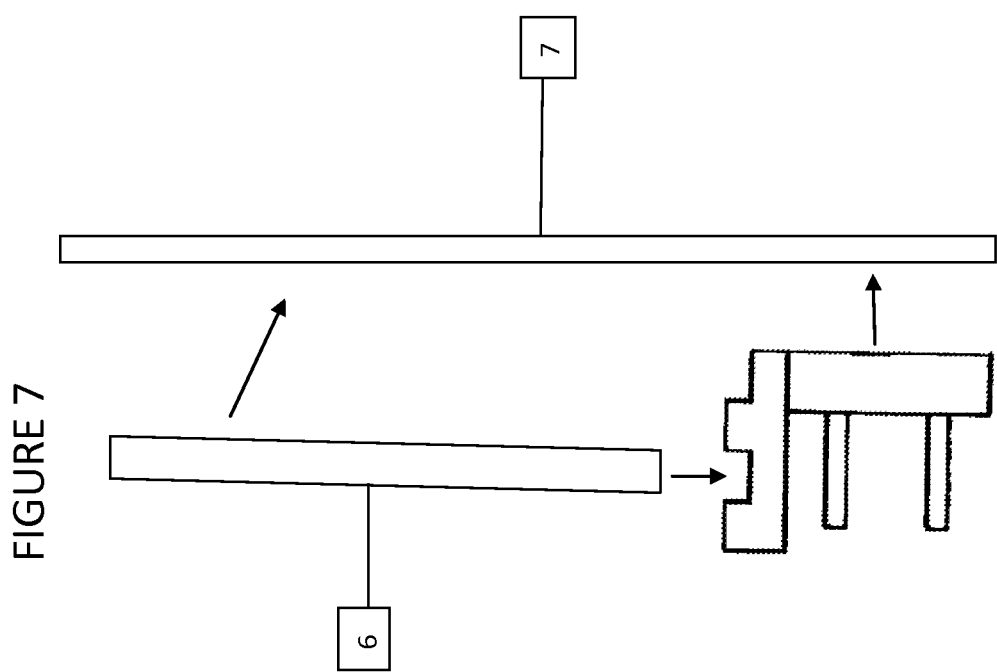
FIG. 7 is a side perspective view of a preferred embodiment of the present invention depicting the functionality of a closed groove-like recession (referred to as 4a on FIG. 5) with a standard award plaque, 6. The base of the award plaque, 6, fits into the close ended groove-like recession, 4a, and leans back up against the wall, 7.

As depicted within FIGS. 6 and 7, the present invention also utilizes the groove-like recessions, 4, to accommodate award plaques, 6, providing for a simple and effortless display of said plaques, 6. The groove-like recessions, 4a and 4b, can be used to securely prop up appropriately sized plaques, 6, against the wall, 7. For use in this situation, the groove-like recessions, 4, and their accompanying sidewalls, 4c, create a small ledge that the base of the plaque(s), 6, can butt up against and remain stationary.

The peg system, 3, of the depicted preferred embodiment of the invention is made of pegs, 3, that horizontally protrude from the frontward facing planar surface of the backboard, 2, of the present invention. These pegs, 3, may be of varying width, length, quantity and arrangement, depending on the embodiment of the present invention. The pegs, 3, may be attached to the backboard, 2, of the present invention in a multitude of ways. The pegs, 3, may be inserted into holes which are drilled at least partially into the backboard and are there held into place with an adhesive or other means of physical attachment, such as screws, nails, or a combination of any or all of the three. The rows of pegs, 3, are used to vertically hang ribbon-style lanyard award medals for display. This trouble-free design makes it practically effortless to reorganize, remove, and replace lanyard-style medals.

Figure 2:
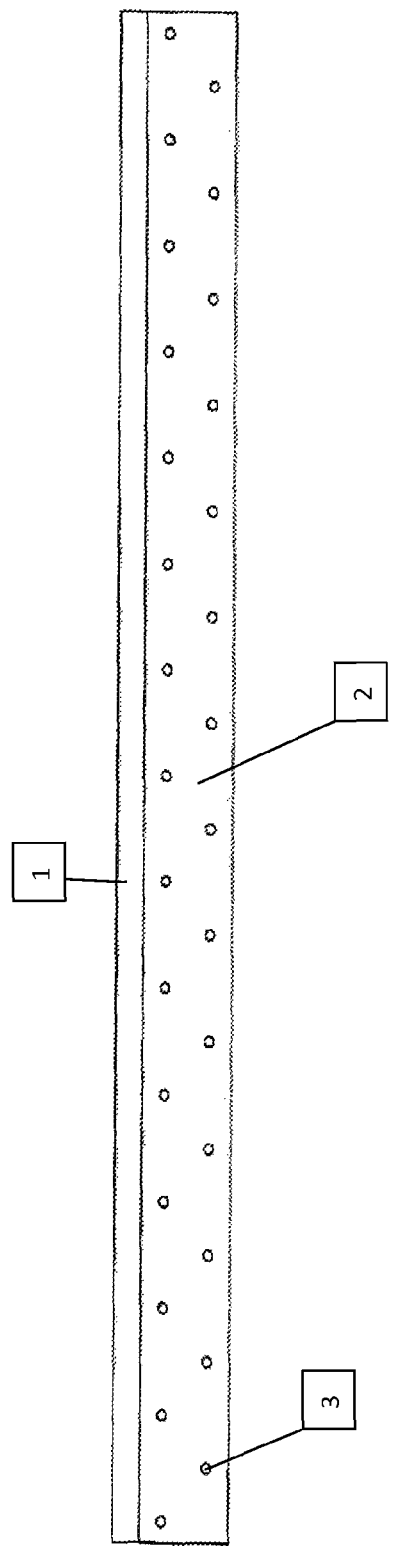
FIG. 2 depicts a full frontal perspective of a preferred embodiment of the present invention. This angle illustrates how this preferred embodiment of the present invention will look when secured on one's wall from a front perspective. Clearly visible from a front, head-on view of this preferred embodiment of the invention is a staggered peg system, 3, a backboard, 2, and a partial view of a top shelf board, 1.
Figure 3:
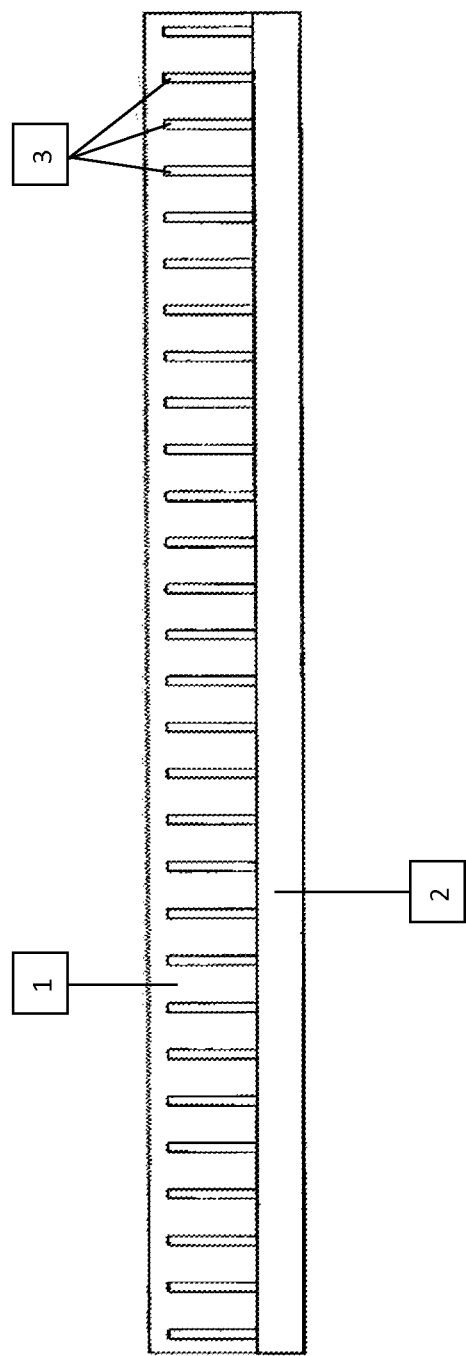
FIG. 3 is an underneath view of a preferred embodiment of the present invention that further illustrates the orientation of a top shelf board 1, a staggered peg system 3, and a backboard 2.

FIG. 2 depicts a full frontal perspective of a preferred embodiment of the present invention. This angle illustrates how this preferred embodiment of the present invention will look when secured on one's wall from a head-on perspective. Clearly visible from a front, head-on view of this preferred embodiment of the invention is a staggered peg system, 3, a backboard, 2, and a partial view of the top shelf board, 1. The preferred embodiment of the present invention depicts at least two rows of staggered pegs so that all displayed lanyard ribbon-style medals, hanging from said pegs, 3, will be visible from a head-on perspective of the present invention, and not be hanging in a position fully in front of one another.

Figure 5:
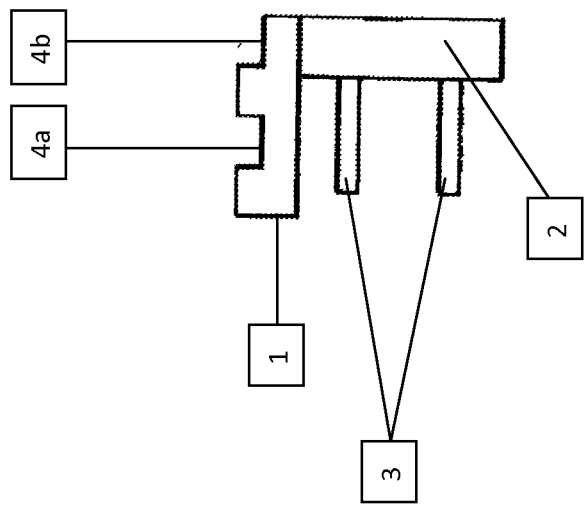
FIG. 5 is a side perspective of a preferred embodiment of the present invention. This figure further depicts the characteristics of the top shelf board, 1, the back board, 2, the staggered peg system 3, and the groove-like recessions, 4a and 4b. In this preferred embodiment the groove-like recessions, 4a and 4b, are depicted in two fashions, a closed groove-like recession, 4a, and a partially open groove-like recession, 4b, which becomes completed upon mounting the unit to a wall, as depicted within FIG. 6.

FIG. 5 is a side perspective of a preferred embodiment of the present invention. This figure further depicts the characteristics of the top shelf board, 1, the back board, 2, the staggered peg system, 3, and the groove-like recessions, 4a and 4b. In this illustrated preferred embodiment the groove-like recessions, 4a and 4b, are depicted in two fashions, a closed groove-like recession, 4a, and a partially open groove-like recession, 4b, which becomes completed as a closed groove-like recession when the depicted embodiment of the invention is mounted to a wall, 7, as depicted within FIGS. 6, 7, and 8.

FIG. 6 is a side perspective view of a preferred embodiment of the present invention, similar to that of FIG. 5. However, in FIG. 6, the sidewalls of the groove-like recessions depicted in FIG. 5 have been indicated by 4c and 4d, respectively. In this illustration, the closed grooved-like recession (depicted as 4a in FIG. 5) comprises two sidewalls, 4c, making this embodiment of the groove-like recession complete in and of itself on the product. The partially open groove-like recession (depicted as 4b in FIG. 5) however is shown comprising of one sidewall, 4d, on the present invention and the opposing sidewall to this groove-like recession is created by a wall, 7, to which the present invention is to be mounted for proper use.

Figure 8:
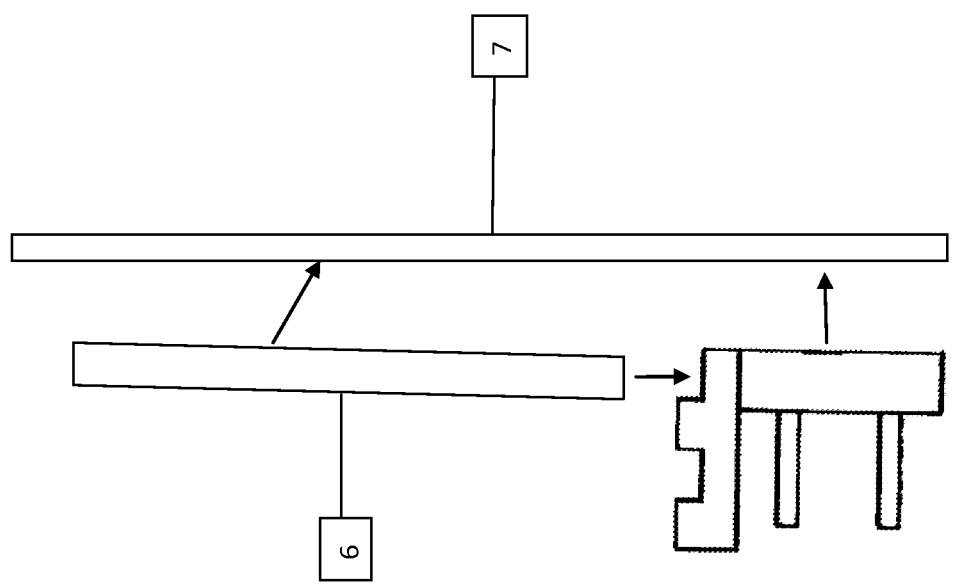
FIG. 8 shows the same desired effect when utilizing the open groove-like recession, 4b, in conjunction with the wall, 7.

FIGS. 7 and 8 is a side perspective view of a preferred embodiment of the present invention depicting the functionality of a groove-like recession (referred to as 4a and 4b on FIG. 5) with a standard award plaque, 6. The base of an appropriately sized award plaque, 6, will fit into the groove-like recession, 4, and leans back up against the wall, 7. FIG. 8 shows the same desired effect when utilizing the open groove-like recession, 4b, in conjunction with the wall, 7, upon which the present invention is mounted.

Figure 9:
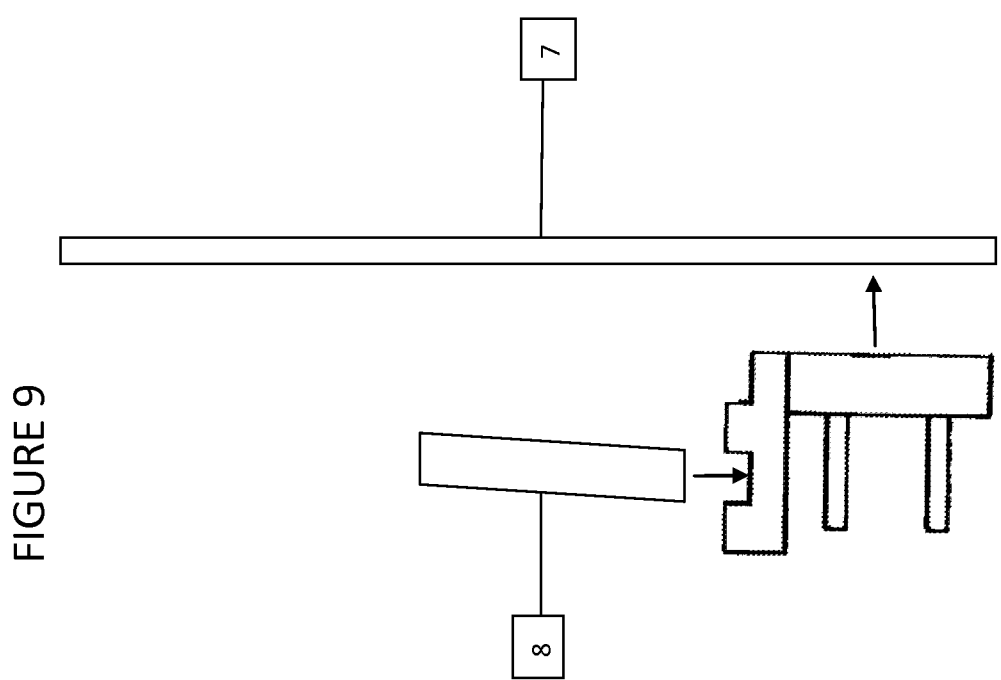
FIG. 9 is another side perspective view of a preferred embodiment of the present invention depicting the functionality of a closed groove-like recession (referred to as 4a on FIG. 5) with a pin-style medal case, 8. The pin-style medal case, 8, can be snuggly placed into the groove-like recessions, 4, and firmly held in an upright position.

FIG. 9 is another side perspective view of a preferred embodiment of the present invention depicting the functionality of a groove-like recession (referred to as 4a on FIG. 5) with a pin-style medal case, 8. The pin-style medal case, 8, can be snuggly placed into the groove-like recessions, 4, and firmly held in an upright position for display. When the depicted embodiment of the present invention is mounted to a wall, 7, the wall, 7, will serve as a second sidewall, 4d FIG. 6, for the open groove-like recession, 4b FIG. 5, that like 4a, will be tight enough of a fit at ⅝" wide to create the necessary pressure to firmly and securely hold a pin-style medal case safely in an upright position optimal for display and repeated insertion and removal of said award cases.

Depending on the desired quantity of display, the present invention can be made in an arrangement of various sizes including varying quantities of pegs for lanyard display. The foregoing description enables one of ordinary skill to make and use the present invention, in what is considered present the best mode thereof. While all various combinations of materials, dimensions, and arrangements of the present invention's features are not exemplified, it is natural that those of ordinary sill in the art will understand and be familiar with the underlying concept and appreciate that the invention may be practice otherwise than as specifically stated without departing from the spirit and scope of the present invention.

What is claimed is:

1. An award display apparatus comprising:
  a backboard having a top side, a bottom side, opposed right and left sides, a front side and a rear side, the backboard extends between the right and left sides and defines a dimension having a first length therebetween, the backboard extends between the top and bottom sides and defines a dimension having a second length therebetween, and the backboard extends between the front and rear sides and defines a dimension having a third length therebetween;
  a shelf board having top side, a bottom side, opposed right and left sides, a front side and a rear side, the shelf board extends between the right and left sides and defines a dimension having a fourth length therebetween, the shelf board extends between the top and bottom sides and defines a dimension having a fifth length therebetween, and the shelf board extends between the front and rear sides and defines a dimension having a sixth length therebetween;
  the backboard is removably attached to the shelf board such that the bottom side of the shelf board rests on the top side of the backboard, whereby the rear side of the backboard is adapted to be removably attached to a substantially vertically extending surface and the rear side of the shelf board is adapted to be placed adjacent the substantially vertically extending surface;
  the first length is equal to the fourth length, the second length is substantially equal to the sixth length, and the third length is substantially equal to the fifth length;
  a plurality of display pegs attached to the front side of the backboard and extending outwardly therefrom and being substantially parallel to the bottom side of the shelf board, whereby the display pegs are arranged in a first and a second row extending between the right and left sides of the back board, and the display pegs being staggered between the right and left sides of the back board, whereby the display pegs are adapted to hold ribbon-style lanyard award medals;
  a first and a second groove located in the shelf board, such that each of the grooves has a bottom surface located below the top side of the shelf board, each of the first grooves extends from the right side to the left side of the shelf board, the first groove having a generally U-shape when viewed in cross section, and the second groove having a generally L-shape when viewed in cross section, such that the first and second grooves are adapted to hold cased award medals, or plaques therein.

2. The apparatus of claim 1 wherein the backboard is comprised of at least one of the following: a board, a plank, a beam, a stave, a slab, or a plane.

3. The apparatus of claim 1, wherein the backboard is comprised of wood, plastic, rubber, acrylic, glass, metal, or any combination(s) thereof.

4. The apparatus of claim 1 wherein the display pegs are comprised of wood, cork, rubber, plastic, acrylic, metal, glass, or any combination(s) thereof.

5. The apparatus of claim 1 wherein the shelf board is comprised of any wood, plastic, rubber, acrylic, glass, metal, or any combination(s) thereof.

6. The apparatus of claim 1 wherein the backboard is removably attached to the shelf board by at least one of the following: glue, nails, bolts, or screws.

7. The apparatus of claim 1 wherein the display pegs are attached to the backboard by at least one of the following: glue, nails, bolts, or screws.

8. The apparatus of claim 1 wherein at least one of the first and second grooves has a width extending between the front and rear side of the shelf board and being of at least two and five eighths inches and a depth extending between the top and bottom sides of the shelf board and being at least one quarter inch.

9. The apparatus of claim 1 wherein the first and second grooves are made by one of the following: routing, molding, or sculpting.

10. The apparatus of claim 1 wherein the first and second grooves are lined with at least one of the following: wood, metal, rubber, plastic, wool, felt, acrylic, glass, Velcro, cotton, silk, microfiber, leather, or suede.

* * * * *